June 16, 1931.  J. W. DEARING  1,810,877
SELF SEALING VALVE CONTROL
Filed June 21, 1922
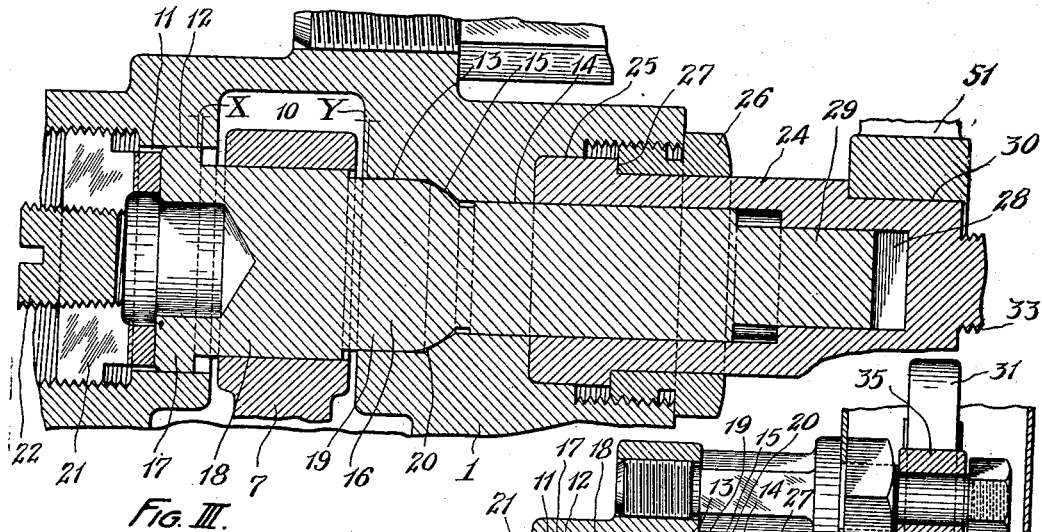
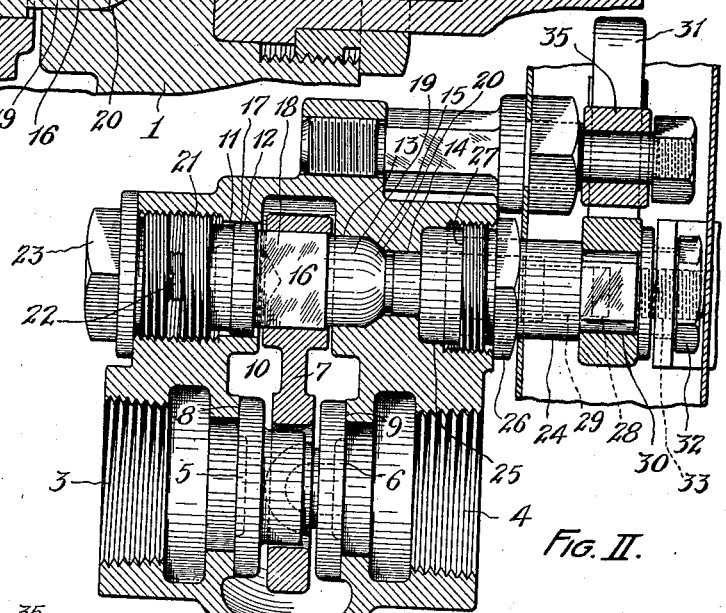
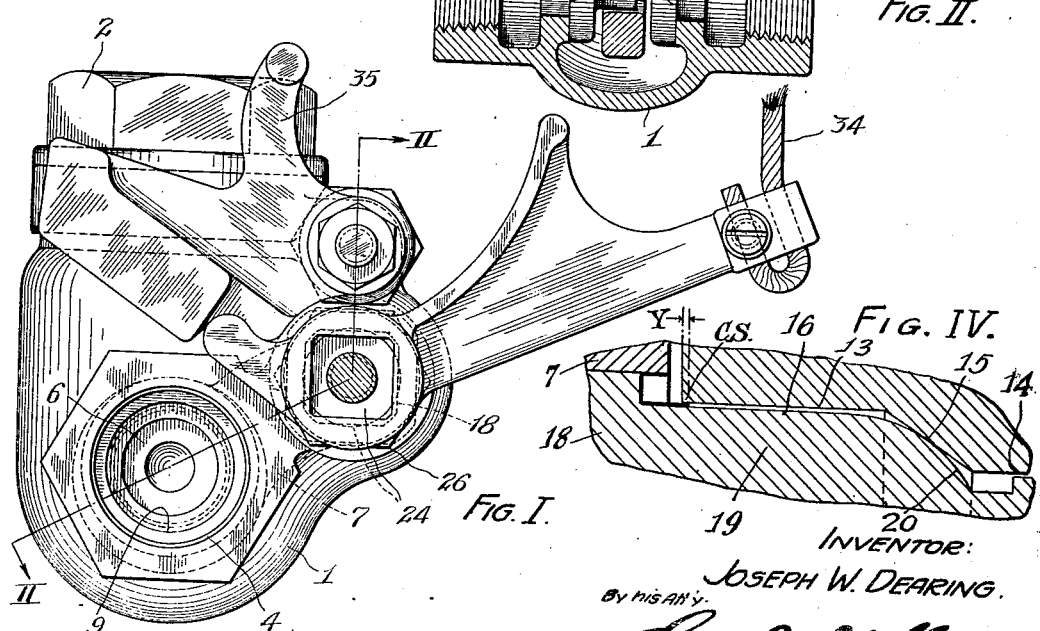
INVENTOR:
JOSEPH W. DEARING.
BY HIS ATT'Y Patented June 16, 1931

1,810,877

UNITED STATES PATENT OFFICE

JOSEPH W. DEARING, OF CLEVELAND, OHIO, ASSIGNOR, BY MESNE ASSIGNMENTS, TO SPRINGFIELD LUMBER COMPANY, OF SPRINGFIELD, ILLINOIS, A CORPORATION OF ILLINOIS

SELF SEALING VALVE CONTROL

Application filed June 21, 1922. Serial No. 569,821.

My invention pertains to a self sealing valve control and more particularly relates to a packless valve structure the valve operating parts of which are initially sealed with a mechanical fit together with a structural arrangement purposely enabling an auxiliary corrosive seal to occur at a more accessible place of exposure thereby protecting the mechanical seal against corrosive exposure.

All previously known valves relying upon a stuffing box eventually after long disuse become inoperative due to corrosive friction or else will leak unless repacked. My patent for a "valve" No. 1,264,282 of April 30, 1918, discloses a remedial construction over which this application is an improvement. I here also employ a floating shaft, but supported it in spaced bearings between which I locate the mechanical seal for the valve operating parts. Between the shaft and the valve casing I deliberately provide a close running fit, that is to say, with a modicum of clearance in excess of that allowed for an ordinary bearing, and locate such clearance fit at a nearer and more accessible place of exposure to and likely corrosion from gaseous elements passing in the valve casing than is the place of the mechanical seal. Practical tests, including accelerated acid tests representing twenty-five to thirty years of average use, have demonstrated that the corrosion which is to be purposely allowed to take place seals the clearance fit by an annular corrosive accumulation of comparatively small width. In practice, the growth of the corrosive accumulation in opposite directions radially of the axis of the annular clearance space closes its initially open end before the corrosive band has attained much width in comparison to the axial length of the annular space defining walls and therefore corrosion in the clearance space necessarily ceases at a point safely distant from the mechanical seal. The frictional resistance in consequence thereof is therefore inconsiderable particularly in opposition to the turning action of the shaft. Actual practice has proven that any friction for which the narrow corrosive band is responsible is readily overcome by the shearing action thereagainst of the shaft which is subject to the control of a strong lever action.

Adverting to the drawings:

Figure I is an end elevation, partly in section, showing a valve mechanism control embodying my invention.

Figure II is a section on line II—II of Figure I.

Figure III is an enlarged portion of Figure II.

Figure IV is a still further enlarged fragmentary portion of Figure III.

A valve casing 1 is provided above with a top screw cap 2 affording communication to the interior. The lower part of the casing is fashioned with oppositely directed tapped inlet and outlet openings 3 and 4, the communication therebetween being subject to the control of a conventional type of gate valve including the disks 5 and 6 pivoted against each other through an opening in the wedge shaped extremity of a valve actuating yoke 7 adapted, in a manner common to the art, to press the disks 5 and 6 firmly against seats 8 and 9 which are provided around the inner ends of the inlet and outlet. The yoke 7 is to be swung through an arc in a space 10 in a manner to be later explained. Inasmuch as nothing is claimed for this old construction it has been briefly described.

To one side the valve casing is fashioned with a variformed bore 11 fashioned with a bearing surface 12 and more inwardly with another bearing surface 13 of smaller diameter as may be seen in Figure III. In turn, beyond the bearing 13 is a still smaller bearing surface 14. Between the bearing surfaces 13 and 14 is a conical surface 15 adapted to serve as a seat for a mechanical seal to be presently explained. A variformed floating shaft 16 is adapted for fitting within the bore 11 so that its one end 17 fits within the bearing 12, so that an adjoining squared section 18 fits within a correspondingly squared opening in the other end of the yoke 7, so that another next adjacent section 19 fits within the bearing 13, so that a spherical surface 20 is adapted to have a wedge contact with the conical seat 15 and so that the round portion of the shaft 16 which is of smallest diameter fits within the bearing 14. The end 17 of the shaft is held in place by a split nut 21 cooperating with threads formed in the bore 11 and adapted to be locked in position by the expansive action of a plug 22. A closing cap 23 is provided.

Encircling the smallest round portion of the shaft is a sleeve 24 movable in a bearing 25 and held in place by a nut 26 the inner end of which abuts a shoulder 27 on the sleeve. One function of the sleeve 24 is to relieve the shaft 16 of the thrusts and strains attending operation of the parts. The inner end 28 of the closed bore in the sleeve 24 is squared and occupied by the squared extremity 29 of the shaft so that any turning movement imparted to the sleeve will turn the shaft 16, rock the yoke 7 and oscillate the gate valve between its open and closed positions.

The outer end of the sleeve 24 is squared at 30 for the reception of the square socket of an actuating lever 31. The lever 31 is to be held in place by one or more nuts 32 secured upon the screwed threaded outer extremity 33 of the sleeve 24. As mounted, an upward pull upon the extremity of the lever 31 through the medium of an attached cable 34 will act to close the valve.

A pivoted weight 35 cooperates with the lever 31 in a manner not germane to the invention herein claimed. The function of the pivoted weight 35 is explained and claimed in my copending application filed of even date herewith.

My earlier Patents No. 1,224,284 and No. 1,264,282 both disclose a mechanical seal substantially the equivalent of the mechanical seal here disclosed as effected by the engagement of the spherical surface 20 with the conical seat 15, but this application presents an experimentally developed improvement in respect to the manner of mounting the floating shaft 16, in respect to the manner of actuating it and in respect to the scheme by which leakage through the fittings of the shaft 16 is prevented thereby furnishing the warrant for the title: "Self sealing valve control".

It is desirable to have the floating shaft 16 mounted in a series of bearings at least one of which is on each side of the mechanical seal. It is furthermore desirable to provide means for endwise adjustment of the floating shaft, that is to say, in a direction parallel with its axis and such adjustment may be effected as heretofore through the agency of the split nut 21 and the locking plug 22. On each side of the yoke 7, in fact, between the bearing 12 and end 17 of the shaft and also between the bearing 13 and the interjacent section 19 of the shaft, I provide a modicum of clearance, very slightly though measurably in excess of the clearance ordinarily allowed for a properly fitted bearing.

It is well to remark here that I propose my valve mechanism to control the main supply pipe of a building. Initially it will be set in a position so that the valve will be open and in consequence so that the gas flowing through the valve will have access to the space 10 and therefore to the minute annular clearance spaces of which mention was just made. As is well known, gaseous elements effect the corrosion of metal as well as the deterioration of any packing material until now discovered. I conceived the possibility of utilizing a corrosive occurence and then designing a construction which would enable the corrosion to be confined to definite locations so as to realize a benefit therefrom by having it act as an auxiliary and absolute seal not only against the escape of gas past the connections of the valve actuating mechanism, but also against undesirable corrosion at the mechanical seal either on the surface 15 or on the surface 20. It will be observed that the annular clearance spaces provided around the shaft 16 on each side of its point of connection with the yoke 7 are both nearer and therefore more accessible to the gas supply than is the point where the mechanical seal is to be maintained between the surfaces 15 and 20. If such surfaces become corroded they will presently allow leakage there, which even an axial adjustment of the shaft 16 may be unable to correct. Accordingly, the primary object of my invention has been to avoid corrosion at the circular line of contact between the surfaces 15 and 20. I have successfully accomplished such object with the aid of the function of the annular clearance spaces previously referred to. Practice has demonstrated that corrosion will occur between the pair of lines at X and between the pair of lines at Y as shown in Figure III. Such lines are to be considered as planes defining the annular spaces where corrosion is purposely allowed initially to occur after which such action ceases and a double and absolute seal becomes established. The corrosive seal will accumulate to something like the form shown in Figure IV where it has been designated as C. S. Valves of this character for the purpose for which I propose mine to be used are likely to be left open for years and only closed in cases of emergency such as the occurence of a fire in the building where installed. In case of fire, one of the first acts of a fireman is to effect the closure of the main gas valve. My actuating lever 31 enables the comparatively small friction occasioned by the two corrosive rings to be easily overcome.

I claim:—

1. The method of sealing a valve casing which consists in fitting a rotatable metal valve actuating member in a bearing formed in said casing with a modicum of clearance in excess of that required for said bearing at a place exposed to the action of corrosive elements in order purposely to allow a measure of corrosion to occur at the most exposed portion of said clearance space and to act as a sealing agent effective to prevent leakage along said bearing.

2. The combination of a metal casing purposed to be occupied by corroding elements, an actuating member rotatably mounted in said casing, said member and casing being provided one with a valve and the other with a valve seat adapted when said member is axially moved to engage and effect a mechanical seal for said fitting, an interior portion of said member being surrounded by a clearance space somewhat in excess of a conventional bearing clearance, said space being open at one end of the casing and closed at its other end by said mechanical seal thereby forming a pocket in which corrosion occurs at the open and most exposed end of said clearance space whereby to cause a cessation of corrosive advance toward said mechanical seal.

3. The method for sealing the ground-fit connection of a rotatable valve actuating member with a valve casing intended to be subjected to corrosive elements, which consists in providing an elongated clearance space around said member and in excess of a conventional bearing clearance and communicating at one end with said casing and closed at its other end by said ground-fit connection, and allowing a corrosive accumulation at the most exposed portion of said clearance space to close its initially open end and thereby cause the advance of corrosion toward said connection automatically to be stopped.

Signed by me, this 25th day of May, 1922.

JOSEPH W. DEARING.